Patented Oct. 11, 1938

2,132,849

UNITED STATES PATENT OFFICE 2,132,849

PROCESS FOR PREPARING ALIPHATIC DINITRILES

Crawford H. Greenewalt and George W. Rigby, Wilmington, Del., assignors to E. I. du Pont de Nemours & Company, Wilmington, Del., a corporation of Delaware No Drawing. Application December 2, 1936, Serial No. 113,834

10 Claims. (Cl. 260—464)

This invention relates to the art of preparing aliphatic dinitriles and more particularly to the preparation of aliphatic dinitriles from aliphatic diamides.

Heretofore certain aliphatic dinitriles have been prepared by dehydrating the corresponding aliphatic diamide with phosphorous halides. For instance, Phookam and Krafft, Ber. 25, 2252 (1892) treated sebaco-diamide with phosphorus pentachloride and obtained sebaconitrile, and Fischl and Steiner in U. S. Patent 1,876,652, issued September 13, 1932, describe the preparation of sebaconitrile by dehydration of ammonium sebacate with phosphorus oxychloride in the presence of pyridine.

This invention has as its object the preparation of aliphatic dinitriles having at least three carbon atoms. A further object is to provide a convenient and economical process by which aliphatic dinitriles may be prepared from diamides of aliphatic dicarboxylic acids having at least three carbon atoms. A still further object is the development of a catalytic dehydration process for the preparation of aliphatic dinitriles from the corresponding diamides of aliphatic dicarboxylic acids having at least three carbon atoms. Another object is the preparation of certain new and useful dehydration products of aliphatic diamides having at least three carbon atoms. Other objects will appear hereinafter.

These objects are accomplished by the following invention in which a diamide of an aliphatic dicarboxylic acid containing at least three carbon atoms is heated in the liquid state in the presence of a superimposed atmosphere of ammonia at an elevated temperature such as between 150° and 300° C. with or without a nitrile-forming catalyst. In the preferred embodiment of this invention the heating is carried out at substantially atmospheric pressure until the reaction as measured by the evolution of water appears to be complete, the pressure on the system is then lowered to a sub-atmospheric pressure which is low enough to cause the distillation and removal of the dinitrile from the reaction zone, yet high enough so that the partial dehydration products will not distill over and the distillation continued. The crude dinitrile so obtained is then treated with concentrated aqueous ammonia to remove imides and acidic substances and purified by redistillation at a reduced pressure. The aqueous solution from which it is separated may then be recycled in the system. It is also preferred to use as the starting material, in place of the diamide, a mixture of an aliphatic dibasic acid containing at least three carbon atoms and sufficient ammonium hydroxide to cause the acid to go into solution at the temperatures used.

The following examples are given for the purpose of illustrating this invention. These examples are not to be considered as limiting the invention since many modifications may be made without departing from the spirit and scope thereof.

Example I

A mixture of 150 parts of sebacic acid, 100 parts of 28% aqueous ammonia and 2 parts of ammonium molybdate was mixed together in a suitable glass vessel attached to a distillation column and provided with a gas inlet for the introduction of ammonia beneath the surface of the solution. A rapid stream of gaseous ammonia was passed through the mixture while the temperature was raised slowly to 250° C. during four hours. The temperature was maintained for 16 hours, during which time water was withdrawn from the system by distillation, the pressure was then reduced to 4 mm. and the distillation continued. A colorless oil, B. P. 172° C., identified as sebaconitrile was collected. The yield was 111.1 parts of sebaconitrile which corresponds to 91.5% of the theoretical amount.

Example II

A mixture of 218 parts of adipamide and 0.432 part of ammonium molybdate was placed in a suitable glass vessel provided with an inlet tube reaching almost to the bottom and an outlet attached to a distillation column. A stream of gaseous ammonia was passed through the vessel while the temperature was raised to 250° C. This temperature was maintained for 16 hours, during which time 40 parts of water were collected. The system was then alternately evacuated and heated in an atmosphere of ammonia until a total of 117 parts of adiponitrile, B. P. 126° C. at 4 mm., was collected. This corresponds to a 72.2% yield of adiponitrile.

Example III

A suitable glass vessel, connected to a condenser and receiver, was charged with 144 parts of adipamide and the temperature raised to 275° C. The pressure was then reduced to 100 mm. and the product distilled by forcing a slow stream of ammonia through the liquid charge. The residue remaining in the flask amounted to 21 parts. The entire distillate, which weighed 118 parts, was saturated with ammonia, filtered from the precipitated adipamide, and extracted with benzene. The benzene solution was then distilled and the fraction boiling at 126° C. at 4 mm. collected. The yield was 25 parts of adiponitrile. The water soluble products contained in the distillate, after the extraction of the dinitrile, may be removed and recycled in the system by returning them to the reaction vessel.

*Example IV*

A mixture of 144 parts of adipamide with 0.288 part of sodium butylamine phosphate was placed in a suitable glass vessel and distilled in a slow stream of ammonia with a bath temperature of 275° C. and under an absolute pressure of 100 mm. mercury. The distillate was extracted with benzene and the benzene solution distilled. After removal of the solvent the main product distilled at 126° C. under 4 mm. pressure. The yield was 28.4 parts of adiponitrile. This corresponds to a 26.3% yield based on the amide used.

The aqueous distillate which contains unconverted intermediate products may be combined with the next batch, thus increasing the overall yield of nitrile.

*Example V*

A mixture of 216 parts of adipamide with 0.432 part of copper-chromite catalyst was placed in a suitable glass vessel and heated at 250° C. for 16 hours while a rapid stream of ammonia was passed through the melt. At the end of this time the pressure was reduced and the fraction boiling at 130° C. at 5 mm. collected. The yield was 87.9 parts of adiponitrile. This corresponds to a yield of 54.2%, based on the adipamide used.

*Example VI*

A mixture of 216 parts of adipamide and 0.432 part of ammonium vanadate was placed in a suitable glass vessel and heated 16 hours at 250° C. with a stream of ammonia passing through the melt. At the end of this time the pressure was reduced and the fraction boiling at 140° C. at 7 mm. collected. The yield was 81.8 parts of adiponitrile. This corresponds to a yield of 50.5% based on the adipamide used.

The aqueous distillate, which contains unreacted intermediate products, may be added to the next batch, thus considerably increasing the overall yield.

*Example VII*

A mixture of 144 parts of adipamide together with 0.288 part of finely ground silica gel was placed in a suitable glass vessel and heated to 275° C. by means of a metal bath while a slow stream of ammonia passed through the melt. The pressure was reduced to 100 mm. and a total of 113 parts of distillate collected in 2½ hours. This distillate was extracted with benzene and distilled. After removal of the benzene, the first fraction had a boiling point of 40° C. at 25 mm. This corresponds to a 2.74% yield of cyclopentanone. The main fraction then distilled at 126° C. and 4 mm. pressure and amounted to 34.5 parts. This corresponds to a 32% yield of adiponitrile.

*Example VIII*

A mixture of 292 parts of adipic acid, 100 parts of 28% aqueous ammonia and 1 part of ammonium molybdate was placed in a suitable glass vessel and heated to 165° C. for 4 hours while a rapid stream of ammonia passed through the melt. The temperature was then gradually raised to 225° C. and a total of 275.8 parts of distillate collected during 24 hours. The pressure on the system was then reduced to 4 mm. and 151.7 parts of oil distilled off during 8 hours. The undistilled residue amounted to 32.9 parts. The aqueous distillate was then mixed with the oil and the entire mixture saturated with ammonia at room temperature. The adipamide which separated amounted to 10 parts. The filtrate from the separation of the adipamide was then extracted with benzene and the combined extracts distilled. After removal of the benzene the entire product distilled at 110° C. under 2 mm. pressure. The yield was 97.9 parts of adiponitrile or 45.3% of the theoretical amount based on the adipic acid used.

The water soluble intermediate products and the recovered adipamide may be utilized in the next batch, thus very materially increasing the overall yield from the adipic acid.

*Example IX*

(a) A mixture of 292 parts of adipic acid, 100 parts of 28% aqueous ammonia and 0.584 part of ammonium molybdate was placed in a suitable glass vessel and heated to 165° C. while a rapid stream of ammonia was passed through the melt. As soon as the melt began to solidify, the temperature was raised gradually to 250° C. This required about 4 hours' total heating time. The pressure was then lowered to about 100 mm. and the distillate, B. P. 190° C., collected. The aqueous and oily distillates were mixed, saturated with ammonia, filtered from the precipitated adipamide and extracted with benzene. The benzene solution was then distilled and the fraction B. P. 126° C. at 4 mm. retained. This fraction, which was adiponitrile, amounted to 92.3 parts or 42.6% of the theoretical based on the adipic acid used.

The aqueous layer, insoluble in benzene, was then evaporated under a slight vacuum until most of the water had been driven off. The solid thus obtained was then recycled according to the following procedure.

(b) A mixture of 292 parts of adipic acid, 157.8 parts of water soluble intermediate products (recovered from 511 g. of adipic acid in experiments similar to the above), 100 parts of 28% aqueous ammonia and 1 part of ammonium molybdate was mixed in a suitable glass vessel. A rapid stream of ammonia gas was passed through the mixture while the temperature was raised to 165° C. for 16 hours. The temperature was then raised to 250° C. and the pressure lowered to 90 mm. of mercury. A total of 481.3 parts of liquid product was thus collected during 48 hours. (The residue in the reaction vessel amounted to 74 parts.) The total distillate was saturated with ammonia, filtered from the adipamide which precipitated, and extracted with benzene. The benzene solution was then distilled and the product B. P. 126° C. at 4 mm. collected. The yield was 135 parts of adiponitrile. This increased the overall yield from the acid to 54%, assuming 42% for the first pass. In addition to this nitrile a total of 340 parts of water and water soluble intermediate products was recovered for a repetition of the cycle.

*Example X*

A mixture of 48.9 parts of adipamide and 5 parts of aluminum chloride in a suitable glass vessel was heated with an external electric heater until the first vigorous reaction had subsided. The pressure was reduced to 30 mm. and the product B. P. 180° to 190° C. collected. This product consisted of an aqueous and an oil phase. The oil was separated and redistilled to give 5 parts of adiponitrile, B. P. 138° C. at 5 mm.

As starting material it is possible to use any of the diamides of the aliphatic dibasic acids of at least 3 carbon atoms. The process has been found particularly useful for the diamides of aliphatic dicarboxylic acids in which the carboxyl groups are separated by at least 4 carbon atoms. Moreover, the dicarboxylic acids themselves may be used, in which case the reaction is preferably carried out in two stages. The first is carried out at a temperature of between 150° and 200° C. Most of the water is eliminated during this stage of the reaction. The second is carried out between 200° and 300° C. and preferably under a slight vacuum so that water and dinitrile distill over together, thus disturbing any equilibrium which may be involved. Both stages are preferably carried out in an atmosphere of ammonia.

The starting material may be either a diamide or a mixture of an aliphatic dicarboxylic acid and concentrated aqueous ammonia, the latter preferably being in the amount of about one-third the weight of the acid. In place of the ammonium hydroxide, water may be used for when ammonia gas is passed through the mixture ammonium hydroxide is formed. The object of the water or concentrated aqueous ammonia is to give a mixture that will be liquid under the conditions of operation. The amount of water or ammonium hydroxide used will therefore depend upon the desired temperature to be used during first stages of the reaction, this amount being sufficient to cause the melting point of the mixture to be below said temperature.

The diamides of the aliphatic dicarboxylic acids of at least 3 carbon atoms may be prepared as a step in this process, as suggested above, either consecutively (as in Example II) with complete dehydration or simultaneously (as in Example I). In case they are prepared consecutively, they may be prepared and isolated as pure compounds or may be used directly from the reaction mixture for the preparation of dinitriles. In either case they may be prepared by any of the methods known to the art such as by the action of ammonia on the corresponding ester, imide, acid chloride or anhydride, or they may be formed by the dehydration of the corresponding ammonium or urea salt of the dibasic acid.

This process may be carried out in the absence of a catalyst as in Example III. In this case the conversion per cycle is comparatively low but the intermediate products may be recycled. However, we prefer to use a catalyst since the rate of dehydration and the yield per pass are greatly increased by their use. Suitable nitrile-forming catalysts which are adapted to the dehydration of amides include contact materials such as ammonium molybdate, ammonium tungstate, ammonium vanadate, ammonium phosphomolybdate, copper chromite, and ammonium or metallic salts of other suitable oxygenated acids from elements of the fifth and sixth groups of the periodic table. These nitrile-forming catalysts may be used in true catalytic amounts, as for example from 0.2 to 10% of the weight of the diamide used. The exact amount of catalyst used will depend upon the temperature, the diamide, the particular catalyst and other factors.

Ordinary dehydration catalysts such as silica gel, alumina, dehydrated alum, phosphated aluminum hydrate, etc. may be used in this process, but these substances give rise to more by-products than nitrile-forming catalysts.

The term "elevated temperature", as used herein, includes the range of temperatures between 150° and 300° C. The exact temperature chosen will vary considerably with the particular catalyst and particular dibasic acid diamide. Thus a very active catalyst such as ammonium vanadate with a particularly susceptible diamide such as adipamide is preferably used at a temperature such as 225° C. or below. On the other hand, with sebacic diamide this same catalyst may be safely employed at 250° C. or above.

The last step in the process in which the intermediate dehydration products are dehydrated to the nitrile is preferably carried out at a sub-atmospheric pressure. The exact pressure employed will vary with the dinitrile being formed, with the temperature at which the dehydration is being carried out, and with the volume of ammonia passing through the system. In general, the pressure should be such that the dinitrile is conveniently removed from the reaction zone as it is formed and should be high enough so that partial dehydration products do not distill from the reaction mixture. When the dehydration temperature is low, the pressure should be proportionately reduced so that the nitrile may distill from the mixture. By increasing the flow of ammonia, the partial pressure of nitrile is reduced and hence the amount of vacuum required is decreased. Thus with a large flow of ammonia a higher pressure may be used than with a slow flow of ammonia.

The amount of ammonia passing through the system should be sufficient to maintain essentially an atmosphere of ammonia within the system at all times. This is particularly important with diamides which easily rearrange to give imides. The excess of ammonia in this case should be greater than is necessary for diamides which do not give imides.

The apparatus employed may vary within wide limits depending on the equipment available, the nitrile being prepared and convenience of operation. We have found it convenient and suitable to use an ordinary distillation apparatus consisting of a pot, column, condenser, and receiver, the pot being provided with a gas inlet for the admission of ammonia and an outlet attached to the column. The entire system may be designed for operation under a vacuum.

The method of isolating the nitrile from the reaction mixture may vary with the particular nitrile being prepared. Those dibasic acids which readily form imides present the most difficult case. We have found it convenient to saturate the distillate with ammonia. This reacts with any imide or acidic intermediate products and converts them to insoluble amide or water soluble ammonium salts which are readily removed by filtration and aqueous extraction respectively. The amide and ammonium salts, moreover, may be returned to the system with the next batch and thus converted to nitrile. With those nitriles which are partially or completely water soluble we have found it expedient to extract the filtered distillate with a solvent such as benzene in which the nitrile is extremely soluble. Separation of nitrile from the benzene extract is easily effected by distillation. Other methods of isolating the dinitrile may be used within the scope of this invention. These may vary with the particular dinitrile, the apparatus available, and the particular conditions under which the dinitrile is formed.

There appear to be five distinct reactions which take place when an aliphatic dibasic acid is heated in the presence of ammonia. These may be represented by the following equations:

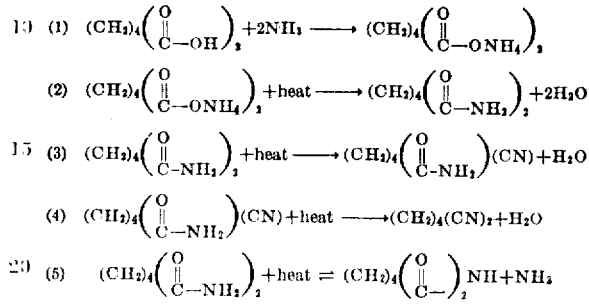

The formation of the cyclic imide is particularly troublesome when the object of the reaction is to obtain a high yield of the dinitrile. This cyclic imide has been isolated in the case of adipic acid and has been found to boil at 123° C. under 4 mm. of mercury and has a melting point of 100° C. It is a white crystalline compound which reacts readily with aqueous ammonia to yield adipamide, M. P. 228° to 228.5° C. It is soluble in adiponitrile and yields a solution of high refractive index. It is conveniently recrystallized from benzene to give shining plates.

Analysis gave: C, 56.89; H, 6.90; N, 10.96
$C_6H_9O_2N$ requires: C, 56.7; H, 7.07; N, 11.0

It has been found that by continually passing ammonia through the reaction mixture, the formation of the imide is suppressed and the yield of nitrile is correspondingly increased.

Continuous removal of both water and nitrile by lowering of the pressure favors the forward reaction of Equations 3 and 4. Unless the nitrile is continuously removed, the reaction comes to an apparent equilibrium at 33% conversion to nitrile. Moreover, continued heating of the dinitrile at 250° C. tends to favor tar formation, especially in the presence of an active catalyst such as ammonium vanadate.

This invention is advantageous over the use of chemical dehydrating agents since no auxiliary chemicals are consumed. This is particularly advantageous economically. Moreover, this invention does not involve handling of corrosive chemicals such as phosphorus pentachloride and phosphorus oxychloride. The phosphorus halides are particularly obnoxious to handle and reaction vessels must be constructed of materials resistant to the hydrogen chloride when these chemicals are used. This is both troublesome and expensive.

It is apparent that many widely different embodiments of this invention may be made without departing from the spirit and scope thereof and therefore it is not intended to be limited except as indicated in the appended claims.

We claim:

1. The process for the production of an aliphatic dinitrile having at least 2 carbon atoms which comprises passing a stream of ammonia through a liquid aliphatic diamide having at least 3 carbon atoms at a temperature sufficient to cause the evolution of water, said reaction being further characterized in that it is carried out in the presence of a catalyst selected from the group consisting of the oxygenated acids and their salts of the metals of Groups V and VI in the periodic system.

2. The process for the production of an aliphatic dinitrile having at least 3 carbon atoms, which comprises passing a stream of ammonia through a liquid aliphatic diamide having at least 3 carbon atoms at a temperature of 150° to 200° C. and distilling until substantially no more water is evolved, then raising the temperature to 200° to 300° C. and continuing the distillation at a sub-atmospheric pressure low enough to cause the distillation and removal of the dinitrile from the reaction zone yet high enough so that the partial dehydration products will be retained in the reaction zone.

3. The process for the production of an aliphatic dinitrile having at least 3 carbon atoms, which comprises passing a stream of ammonia through a liquid aliphatic diamide having at least 3 carbon atoms at a temperature of 150° to 200° C. and distilling until substantially no more water is evolved, then raising the temperature to 200° to 300° C. and continuing the distillation at a sub-atmospheric pressure low enough to cause the distillation and removal of the dinitrile from the reaction zone yet high enough so that the partial dehydration products will be retained in the reaction zone, said reaction being further characterized in that it is carried out in the presence of a catalyst selected from the group consisting of the oxygenated acids and their salts of the metals of Groups V and VI in the periodic system.

4. The process for the production of an aliphatic dinitrile having at least 3 carbon atoms which comprises passing a stream of ammonia through a liquid aliphatic diamide having at least 3 carbon atoms at a temperature of 150° to 200° C. and distilling until substantially no more water is evolved, then raising the temperature to 200° to 300° C. and continuing the distillation at a sub-atmospheric pressure low enough to cause the distillation and removal of the dinitrile from the reaction zone yet high enough so that the partial dehydration products will be retained in the reaction zone, recovering the dinitrile from the distillate and recycling the dinitrile free distillate back to the reaction zone.

5. The process for the production of an aliphatic dinitrile having at least 3 carbon atoms, which comprises passing a stream of ammonia through a liquid mixture comprising as a starting material an aliphatic dibasic acid containing at least 3 carbon atoms and ammonium hydroxide at a temperature sufficient to cause the evolution of water, but below 300° C. for a sufficient length of time to cause the formation of said dinitrile, then reducing the pressure to a sub-atmospheric pressure low enough that the dinitrile formed will be removed by distillation from the reaction zone but high enough that the partial dehydration products will tend to remain in the reaction zone, said reaction being further characterized in that it is carried out in the presence of a catalyst selected from the group consisting of the oxygenated acids and their salts of the metals of Groups V and VI in the periodic system.

6. The process for the production of an aliphatic dinitrile having at least 3 carbon atoms, which comprises passing a stream of ammonia through a liquid mixture comprising as a starting material an aliphatic dibasic acid containing at least 3 carbon atoms and ammonium hydroxide at a temperature of 150° to 200° C. and distilling until substantially no more water is evolved, then raising the temperature to 200° to 300° C. and continuing the distillation at a subatmospheric pressure low enough that the dinitrile is removed by distillation from the reaction zone but high enough that the partial dehydration products tend to remain in the reaction zone, recovering the dinitrile from the distillation products and returning the distillation products freed from dinitrile to the reaction zone, said reaction being further characterized in that it is carried out in the presence of a catalyst selected from the group consisting of the oxygenated acids and their salts of the metals of Groups V and VI in the periodic system.

7. The process for the production of adiponitrile which comprises passing ammonia through a liquid mixture of adipamide and a catalyst comprising essentially ammonium molybdate at a temperature of about 250° C.

8. The process for the production of sebaconitrile which comprises passing ammonia through a mixture of sebacamide and a catalyst comprising essentially ammonium molybdate at a temperature of about 250° C.

9. The process which comprises passing ammonia through a mixture of sebacic acid and aqueous ammonia containing a small amount of ammonium molybdate as a catalyst while slowing raising the temperature to about 250° C., maintaining the temperature at about this point while distilling water from the system until the reaction as measured by the evolution of water appears to be complete, then reducing the pressure to about 4 mm., and recovering the sebaconitrile by distillation at this pressure.

10. The process which comprises passing ammonia through a mixture of adipic acid and aqueous ammonia in which there is a small amount of ammonium molybdate as a catalyst, raising the temperature gradually to 250° C. so as to keep the mixture fluid, then stopping the reaction when it is complete, lowering the pressure to about 1 mm., and distilling so as to recover adiponitrile from the reaction mixture.

CRAWFORD H. GREENEWALT.
GEORGE W. RIGBY.

CERTIFICATE OF CORRECTION.

Patent No. 2,132,849.  October 11, 1938.

CRAWFORD H. GREENEWALT, ET AL.

It is hereby certified that error appears in the printed specification of the above numbered patent requiring correction as follows: Page 4, first column, line 69, claim 1, for the numeral "2" read 3; and that the said Letters Patent should be read with this correction therein that the same may conform to the record of the case in the Patent Office.

Signed and sealed this 6th day of December, A. D. 1938.

Henry Van Arsdale
Acting Commissioner of Patents.

(Seal)

ide at a temperature of 150° to 200° C. and distilling until substantially no more water is evolved, then raising the temperature to 200° to 300° C. and continuing the distillation at a subatmospheric pressure low enough that the dinitrile is removed by distillation from the reaction zone but high enough that the partial dehydration products tend to remain in the reaction zone, recovering the dinitrile from the distillation products and returning the distillation products freed from dinitrile to the reaction zone, said reaction being further characterized in that it is carried out in the presence of a catalyst selected from the group consisting of the oxygenated acids and their salts of the metals of Groups V and VI in the periodic system.

7. The process for the production of adiponitrile which comprises passing ammonia through a liquid mixture of adipamide and a catalyst comprising essentially ammonium molybdate at a temperature of about 250° C.

8. The process for the production of sebaconitrile which comprises passing ammonia through a mixture of sebacamide and a catalyst comprising essentially ammonium molybdate at a temperature of about 250° C.

9. The process which comprises passing ammonia through a mixture of sebacic acid and aqueous ammonia containing a small amount of ammonium molybdate as a catalyst while slowing raising the temperature to about 250° C., maintaining the temperature at about this point while distilling water from the system until the reaction as measured by the evolution of water appears to be complete, then reducing the pressure to about 4 mm., and recovering the sebaconitrile by distillation at this pressure.

10. The process which comprises passing ammonia through a mixture of adipic acid and aqueous ammonia in which there is a small amount of ammonium molybdate as a catalyst, raising the temperature gradually to 250° C. so as to keep the mixture fluid, then stopping the reaction when it is complete, lowering the pressure to about 1 mm., and distilling so as to recover adiponitrile from the reaction mixture.

CRAWFORD H. GREENEWALT.
GEORGE W. RIGBY.

CERTIFICATE OF CORRECTION.

Patent No. 2,132,849.     October 11, 1938.

CRAWFORD H. GREENEWALT, ET AL.

It is hereby certified that error appears in the printed specification of the above numbered patent requiring correction as follows: Page 4, first column, line 69, claim 1, for the numeral "2" read 3; and that the said Letters Patent should be read with this correction therein that the same may conform to the record of the case in the Patent Office.

Signed and sealed this 6th day of December, A. D. 1938.

Henry Van Arsdale
Acting Commissioner of Patents.

(Seal)